N. F. RICE.
VALVE PAD FOR PNEUMATIC TIRES.
APPLICATION FILED OCT. 20, 1919.
1,395,731. Patented Nov. 1, 1921.
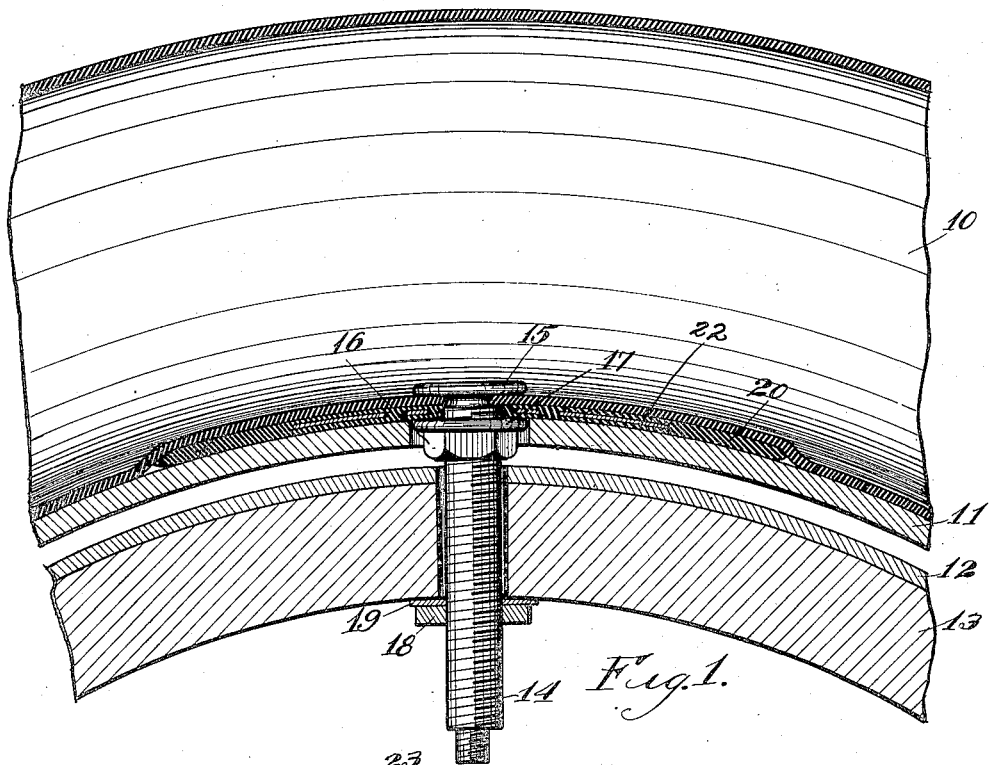
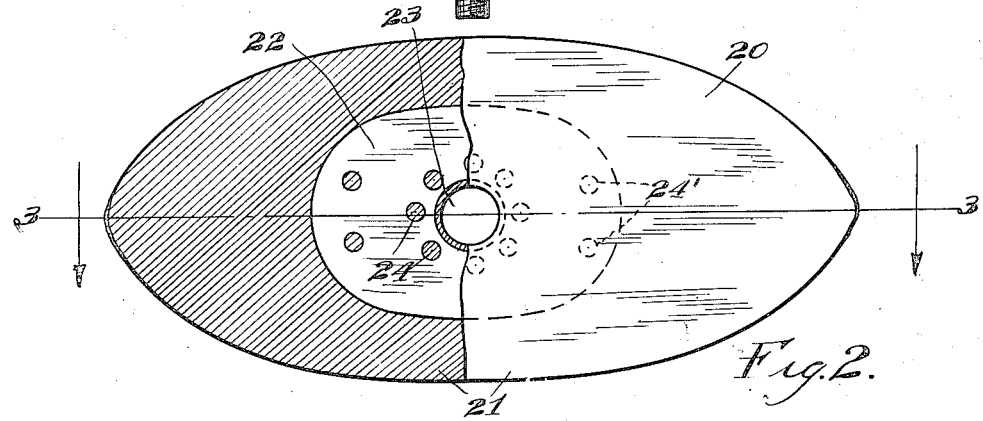
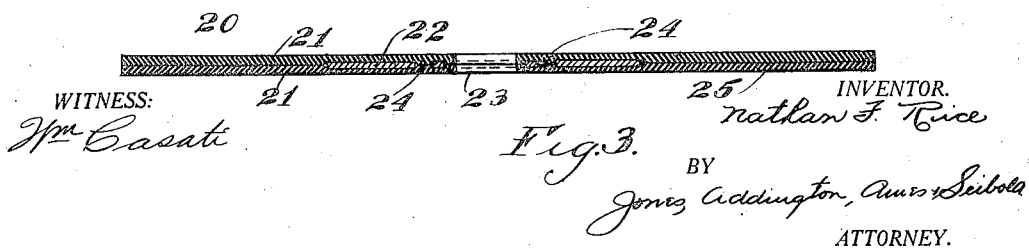
WITNESS: Wm Casati
INVENTOR.
Nathan F. Rice
BY
Jones, Addington, Ames & Seibold
ATTORNEY.

UNITED STATES PATENT OFFICE.

NATHAN F. RICE, OF CHICAGO, ILLINOIS.

VALVE-PAD FOR PNEUMATIC TIRES.

1,395,731.  Specification of Letters Patent.  Patented Nov. 1, 1921.

Application filed October 20, 1919. Serial No. 331,772.

*To all whom it may concern:*

Be it known that I, NATHAN F. RICE, a citizen of the United States, residing at Chicago, in the county of Cook and State of Illinois, have invented new and useful Improvements in Valve-Pads for Pneumatic Tires, of which the following is a full, clear, concise, and exact description, reference being had to the accompanying drawing, forming a part of this specification.

This invention relates to a valve pad for the inner tubes of pneumatic vehicle tires.

The object of my invention is the production of a valve pad which will be so constructed as to be effectively reinforced at the point of connection therewith of the valve.

A further object is the production of a valve pad of the character mentioned in which the reinforcing means provided therein will be adapted to positively prevent the valve pad being moved or forced from engagement with the clamping means provided upon the valve.

A still further object is the provision in a laminated pad of the character mentioned of a reinforcing plate arranged between the laminated portions of the pad, which will be so formed as to permit of effective vulcanizing together of the laminations of the pad at the places of registration of said laminations with said plate.

Other objects will appear hereinafter.

With these objects in view, the invention consists in the combinations and arrangements of parts hereinafter described and claimed.

The invention will be best understood by reference to the accompanying drawings forming a part of this specification, and in which—

Figure 1 is a fragmental sectional view of the inner tube, demountable rim and wheel felly of a conventional vehicle wheel, showing my valve pad in connection therewith;

Fig. 2 is a plan view of the valve pad, with a portion thereof broken away to expose an underlying part; and Fig. 3 is a section taken on line 3—3 of Fig. 2.

The preferred form of construction, as illustrated in the drawings, is shown in connection with an inner tube 10 of conventional type, which is supported on a demountable rim 11, the latter in turn being supported on the steel band 12 of the wheel felly 13. These elements have alining openings therein to receive the valve stem or tube 14, said valve stem passing through all these members and extending somewhat beyond the felly 13 of the wheel as is usual.

The valve stem 14 is provided at its inner end with an integrally formed annular flange 15 which engages against the inner side of the tube 10. The flange 15 serves as a stationary clamping element with which coöperates a movable clamping element provided at the outer side of the tube 10, said movable clamping element consisting of a nut 16 threaded upon the valve stem 14 and a washer 17 provided at the inner side of said nut as clearly seen in Fig. 1. The usual retaining nut 18 and washer 19 are provided upon the outer end of valve stem 14 for engagement with the inner side of the wheel felly.

Provided upon the air tube 10 at the point of connection therewith of the valve stem 14 is a reinforcing pad 20. Said pad is of laminated construction, the same being formed of a plurality of superimposed layers or sheets 21 which are preferably constructed of a suitable rubber fabric, said layers being vulcanized together to form the pad, and the pad in turn being vulcanized to the outer side of the air tube 10.

Arranged centrally in the pad between the laminations or layers thereof is a reinforcing metallic plate 22 through which and the laminations of the pad an opening 23 is formed to accommodate the valve stem 14 as clearly seen in Fig. 1. In order to permit of effective vulcanizing together of the laminations of the pad at the plate 22, the latter is formed with openings 24 and 24' whereby, in the vulcanizing operation, the portions of the pad laminations at said openings will contact with each other and be vulcanized together. It will be observed that the openings 24 are arranged in close proximity with the central opening in the plate through which the valve stem passes, this arrangement of said openings 24 being of special advantage in that it effectively holds and reinforces the portions of the pad laminations where the pad is subjected to severe pressure through connection of the valve stem therewith.

The arrangement is such that in the application of the valve stem to the air tube after the latter has been provided with the pad 20, the air tube together with the registering portion of the pad at the opening 23 therein will be clamped between the flange 15 and the washer 17. The central opening in the plate 22 is of a diameter less than the external diameter of the clamping elements 15 and 17 so that the edge portion of said plate surrounding said opening will be positioned between said clamping elements 15 and 17 thereby positively preventing the corresponding portion of the pad and the air tube being forced or pressed from engagement with the engaging surfaces of the clamping elements when pressure is applied to the latter. It has been found in constructions of this character where no reinforcing is employed around the valve opening in the pad and air tube, that frequently when the valve stem is applied, the engaged portions of the pad and air tube are pressed or forced out of engagement with the clamping surfaces, with the result that leakage is produced at this point. With applicant's construction, however, the possibility of displacing the pad and air tube by reason of pressure applied to the clamping elements of the valve stem, is positively precluded and a tight joint thus insured.

Moreover, the provision of a wide plate surrounding the opening in the pad through which the valve stem projects, results in a reinforcement of the pad against sharp flexing around the valve stem, the provision of a plate, as employed, serving to distribute any longitudinal pressure of the valve upon the pad so that flexing of the latter and the air tube is distributed over a wide area around the valve stem and thus severe wear in the vicinity of the valve stem, through excessive flexing, avoided.

While I have illustrated and described the preferred form of invention, I do not wish to be limited to the specific embodiments herein illustrated and described, but desire to avail myself of such variations and modifications as come within the spirit of the invention as defined by the claims hereunto appended.

Having thus described my invention, what I claim as new and desire to secure by Letters Patent is:

1. In combination, a valve, a resilient element through which said valve passes, means on said valve for clampingly engaging said element, and a non-extensible plate coöperating with said element to prevent the same being moved out of engagement with said clamping means.

2. In combination with a pneumatic tube, a valve therefor, means securing said valve to said tube, said means comprising a laminated pad applied to said tube, said valve passing through said pad, means on said valve clampingly engaging said pad, and a reinforcing non-extensible plate coöperating with said pad, the inner edge of said plate being so disposed as to be positioned between said clamping means.

3. In combination with a pneumatic tube, a valve therefor, means securing said valve to said tube, said means comprising a laminated pad applied to said tube, said valve passing through said pad, opposing clamping means on said valve clampingly engaging said pad, and a reinforcing plate embedded in said pad and having an opening for the passage of said valve, the edge of said plate around said opening being positioned to lie between the opposing surfaces of said clamping means.

4. In combination with a pneumatic tube, a valve therefor, means supporting said valve with respect to said inner tube, said means comprising laminated portions of one material separated from each other by a reinforcing plate of non-extensible material.

5. In combination with a pneumatic tube, a valve therefor, means supporting said valve with respect to said inner tube, said means comprising laminated portions of one material separated from each other by a non-extensible plate, said means being vulcanized on said inner tube, and means on said valve clampingly engaging said supporting means.

6. In combination with a pneumatic tube, a valve therefor, means supporting said valve with respect to said inner tube, said means comprising laminated portions having an apertured non-extensible plate therebetween, said means being vulcanized to the inner tube, and means on said valve clampingly engaging said supporting means.

7. In combination with a pneumatic tube, a valve therefor, means supporting said valve with respect to said inner tube, said means comprising laminated portions having an apertured non-extensible plate therebetween, said means being vulcanized to said inner tube, said laminations being vulcanized together at the apertures in said plate, and means on said valve clampingly engaging said supporting means.

8. In combination with a pneumatic tube, a valve therefor, means supporting said valve with respect to said inner tube, said means comprising laminated portions having an apertured plate therebetween, said means being vulcanized to said inner tube, said laminations being vulcanized together at the apertures in said plate and the portions thereof surrounding said plate, and means on said valve clampingly engaging said supporting means.

9. In combination with a pneumatic tube, a valve therefor, means supporting said valve with respect to said inner tube, said means comprising a laminated pad of fabricated material, and a non-extensible plate between said laminations, said laminations being vulcanized together to inclose said plate, and means on said valve clampingly engaging said supporting means.

10. In combination with a pneumatic tube, a valve therefor, means supporting said valve with respect to said inner tube, said means comprising a laminated portion having a non-extensible plate embedded therein, said means being vulcanized to said inner tube and means on said valve engaging against said laminated portion adjacent the inner edge of said plate to secure said valve thereto, and means on said valve clampingly engaging said supporting means.

11. In combination with a pneumatic tube, a valve therefor, means supporting said valve with respect to said inner tube, said means comprising a laminated portion having a plate arranged between the lamination thereof, said means being vulcanized to said inner tube and opposing clamping means on said valve engaging said laminated portion adjacent the central portion of said plate to secure said valve thereto.

12. In combination with a pneumatic tube, a valve therefor, means supporting said valve with respect to said inner tube, said means comprising a liminated pad having a plate member therebetween, an opening in said pad and plate member and a plurality of small openings surrounding said first mentioned opening and in close proximity thereto, and means on said valve clampingly engaging said supporting means.

13. In combination with a pneumatic tube, a valve therefor, means supporting said valve with respect to said inner tube, said means comprising a laminated pad having a plate member therebetween, an opening in said pad and plate member and a plurality of small openings surrounding said first mentioned opening and in close proximity thereto, said laminated portions being formed integral through the last mentioned openings, and means on said valve clampingly engaging said supporting means.

14. A valve pad comprising resilient portions having a plate of non-extensible material disposed therebetween, said plate and resilient portions having openings therein, and a plurality of small openings formed in said plate adjacent said first-named opening through which said resilient portions are secured together.

15. In combination, a valve, a resilient element through which said valve passes, means on said valve for clampingly engaging said element; and a non-extensible flexible member coöperating with said element to prevent the same being moved out of engagement with said clamping means.

16. In combination, a valve, a resilient element through which said valve passes, means on said valve for clampingly engaging said element; and a non-extensible flexible metallic plate coöperating with said element to prevent the same being moved out of engagement with said clamping means.

In witness whereof, I have hereunto subscribed my name.

NATHAN F. RICE.